US010156254B2

(12) United States Patent
Bhosale et al.

(10) Patent No.: US 10,156,254 B2
(45) Date of Patent: Dec. 18, 2018

(54) BEARING FOR HOLDING A COMPONENT (71) Applicant: MAHINDRA SUSTEN PVT. LTD., Worli, Mumbai (IN)

(72) Inventors: Sandeep Jayawant Bhosale, Navi Mumbai (IN); Apurav Padam Jain, Mumbai (IN); Basant Kumar Jain, Mumbai (IN)

(73) Assignee: MAHINDRA SUSTEN PVT LTD., Maharashtra (IN)

( * ) Notice: Subject to any disclaimer, the term of this patent is extended or adjusted under 35 U.S.C. 154(b) by 0 days.

(21) Appl. No.: 15/244,610

(22) Filed: Aug. 23, 2016

(65) Prior Publication Data

US 2017/0058944 A1     Mar. 2, 2017

Related U.S. Application Data

(60) Provisional application No. 62/215,954, filed on Sep. 9, 2015.

(30) Foreign Application Priority Data

Aug. 24, 2015   (IN) .......................... 3217/MUM/2015

(51) Int. Cl.
    *F16C 11/04*      (2006.01)
    *F16L 3/08*      (2006.01)
    (Continued)

(52) U.S. Cl.
    CPC .............. *F16C 11/04* (2013.01); *F16C 17/02* (2013.01); *F16C 33/046* (2013.01); *F16C 33/20* (2013.01);
    (Continued)

(58) Field of Classification Search
    CPC ........ F16C 11/04; F16C 17/02; F16C 33/046; F16C 33/20; F16C 33/26; F16C 35/02;
    (Continued)

(56) References Cited

U.S. PATENT DOCUMENTS 2,265,065 A * 12/1941 Daywalt ................. F16C 33/26
    384/282
3,936,100 A * 2/1976 Moores, Jr. ............. F16C 23/00
    384/215

(Continued)

*Primary Examiner* — Tan Le
(74) *Attorney, Agent, or Firm* — Sand & Sebolt (57) ABSTRACT

The present disclosure relates to the field of mechanical engineering. The bearing of the present disclosure comprises few components and can be assembled easily on site. The bearing includes a housing and a plurality of sectional elements. The housing is disposed on a base and has a hollow profile. The plurality of sectional elements is disposed within the housing and is configured to hold the component therewithin. The plurality of sectional elements facilitates rotation of the component. Each of the plurality of sectional elements is defined by an operative outer surface and an operative inner surface. The operative outer surface has a shape complementary to an operative inner surface of the housing. The operative inner surface of each of the plurality of sectional elements has a shape complementary to the component to be held within the bearing.

6 Claims, 10 Drawing Sheets

(51) Int. Cl.
  *F16L 1/06*   (2006.01)
  *F16L 21/06*  (2006.01)
  *F16C 35/02*  (2006.01)
  *F16C 17/02*  (2006.01)
  *F16C 33/04*  (2006.01)
  *F16C 33/20*  (2006.01)
  *F16L 59/135* (2006.01)

(52) U.S. Cl.
  CPC .......... *F16C 35/02* (2013.01); *F16C 2208/32* (2013.01); *F16C 2208/60* (2013.01); *F16C 2208/66* (2013.01); *F16C 2208/76* (2013.01); *F16C 2208/78* (2013.01); *F16L 3/08* (2013.01); *F16L 59/135* (2013.01)

(58) Field of Classification Search
  CPC .............. F16C 2208/32; F16C 2208/60; F16C 2208/66; F16C 2208/76; F16C 2208/78; F16L 3/00; F16L 3/08; F16L 3/1016; F16L 3/24; F16L 59/025; F16L 59/123

USPC ................ 248/671, 677, 678, 673, 62, 74.1; 384/282, 215, 47; 138/106, 149, 147
  See application file for complete search history.

(56) References Cited

U.S. PATENT DOCUMENTS

| | | | | |
|---|---|---|---|---|
| 4,530,478 A | * | 7/1985 | McClellan | F16L 59/135 138/106 |
| 4,720,207 A | * | 1/1988 | Salani | B28D 1/186 172/123 |
| 4,804,158 A | * | 2/1989 | Collins | F16L 59/135 248/74.4 |
| 5,253,816 A | * | 10/1993 | Kastingschafer | B02C 4/30 100/176 |
| 5,261,633 A | * | 11/1993 | Mastro | F16L 3/18 248/68.1 |
| 5,505,598 A | * | 4/1996 | Murray | B28D 1/18 404/90 |
| 2002/0085773 A1 | * | 7/2002 | Shoda | F16C 19/36 384/47 |

* cited by examiner

BEARING FOR HOLDING A COMPONENT

CROSS REFERENCE TO RELATED APPLICATIONS

This application claims the benefit of prior U.S. Provisional Application Ser. No. 62/215,954, filed on Sep. 9, 2015; the disclosure of which is entirely incorporated herein by reference.

This application claims priority from Indian Application Serial No. 3217/MUM/2015, filed on Aug. 24, 2015; the disclosure of which is entirely incorporated herein by reference.

FIELD

The present disclosure relates to the field of mechanical engineering. Particularly, the present disclosure relates to the field of bearings.

BACKGROUND

Bearings are devices for supporting rotating or angularly displaceable components. These bearings are required for smooth angular displacement and particularly for frictionless rotation of the component within a housing.

Existing bearings need several components for their assembly, are not failsafe, need frequent maintenance, and are also expensive. It is difficult to assemble bearings on-site, and particularly, if it has to be done at remote locations. Additionally, assembling such bearings require special tools and skilled labour.

Therefore, there is felt a need of a bearing that eliminates the drawbacks of the conventional bearings.

OBJECTS

An object of the present disclosure is to provide a bearing that can be assembled easily on-site.

Another object of the present disclosure is to provide a bearing which has a few components.

An object of the present disclosure is to provide a bearing that is easy to manufacture and requires little or almost no maintenance over use for several years.

Another object of the present disclosure is to provide a bearing that can be assembled without the help of special tools.

Still another object of the present disclosure is to provide a bearing that can be assembled by a person not skilled in the art.

Other objects and advantages of the present disclosure will be more apparent from the following description, which is not intended to limit the scope of the present disclosure.

SUMMARY

The present disclosure envisages a bearing for holding a component. The bearing includes a housing and a plurality of sectional elements. The housing is disposed on a base and has a hollow profile. The plurality of sectional elements is disposed within the housing, and is configured to hold the component therewithin. The plurality of sectional elements facilitates rotation of the component. Each of the plurality of sectional elements is defined by an operative outer surface and an operative inner surface. The operative outer surface has a shape complementary to an operative inner surface of the housing. The operative inner surface of each of the plurality of sectional elements has a shape complementary to the component to be held within the bearing.

In an embodiment, the cross-section of the component is selected from the group consisting of square, rectangular, triangular, polygonal, semi-circular, circular, complex geometric, and non-geometric shapes.

In another embodiment, the operative outer surface of each of the plurality of sectional elements has an arcuate shape.

In still another embodiment, a plurality of slots is configured on the operative outer surface of each of the plurality of sectional elements.

In yet another embodiment, the operative inner surface of each of the plurality of sectional elements has a stepped profile for receiving the component.

In still another embodiment, each of the plurality of sectional elements has flanges that are configured on either end thereof, and adapted to restrict the motion of the each of the plurality of sectional elements along the longitudinal axis thereof.

In yet another embodiment, the material of each of the plurality of sectional elements is at least one polymeric material selected from the group consisting of Nylon, Polypropylene, Polyoxymethylene, polyethylene, polyolefins, polyamides, polyaramides, polytetrafluoroethylene, and composites thereof.

BRIEF DESCRIPTION OF ACCOMPANYING DRAWING a bearing will now be described with the help of the non limiting accompanying drawing, in which.

LIST OF REFERENCE NUMERALS

100—Bearing
102—Housing
103—Component
104—Plurality of sectional elements
106—Operative outer surface
108—Operative inner surface
110—Flanges
112—Base
114, 116, 118, 120—C-channel
122, 124—Plurality of slots
200—Bearing
204—At least two sectional elements

DETAILED DESCRIPTION

Conventional bearings need several components for their assembly, are not failsafe, need frequent maintenance, and are also expensive. It is difficult to assemble bearings on-site, and particularly, if it has to be done at remote locations. Additionally, assembling such bearings require special tools and skilled labour.

The present disclosure envisages a bearing for holding a component that is designed to overcome the drawbacks of the conventional bearings. A preferred embodiment of the bearing for holding a component, of the present disclosure will now be described in detail with reference to the accompanying drawing. The preferred embodiment does not limit the scope and ambit of the disclosure. The description provided is purely by way of example and illustration.

Figure 1:
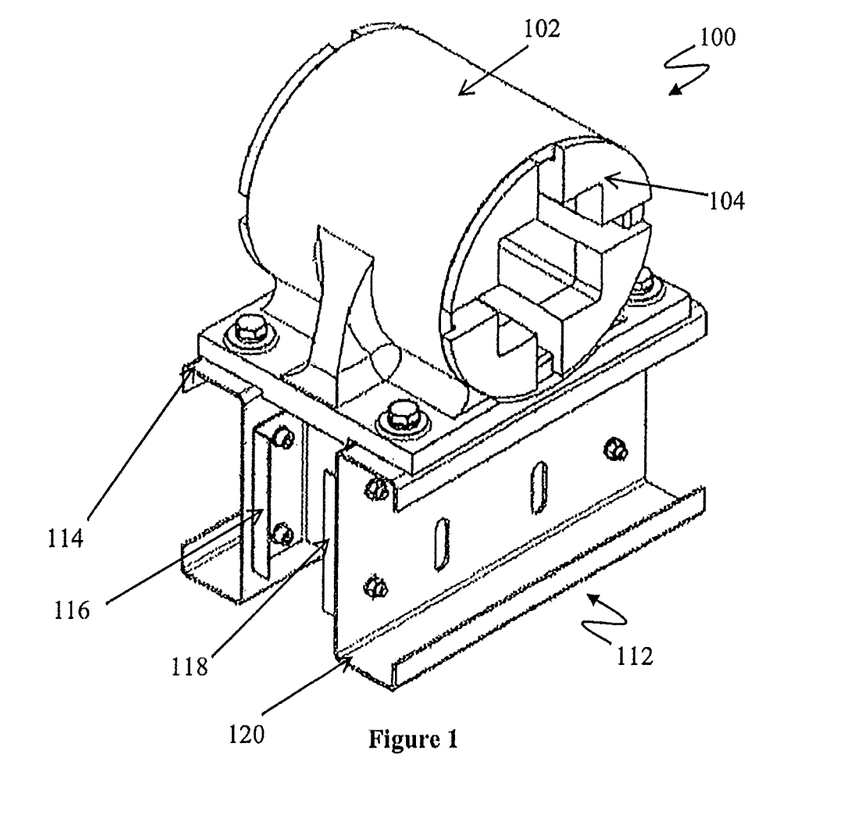
FIG. 1 illustrates an isometric view of the bearing, in accordance with an embodiment of the present disclosure.
Figure 2:
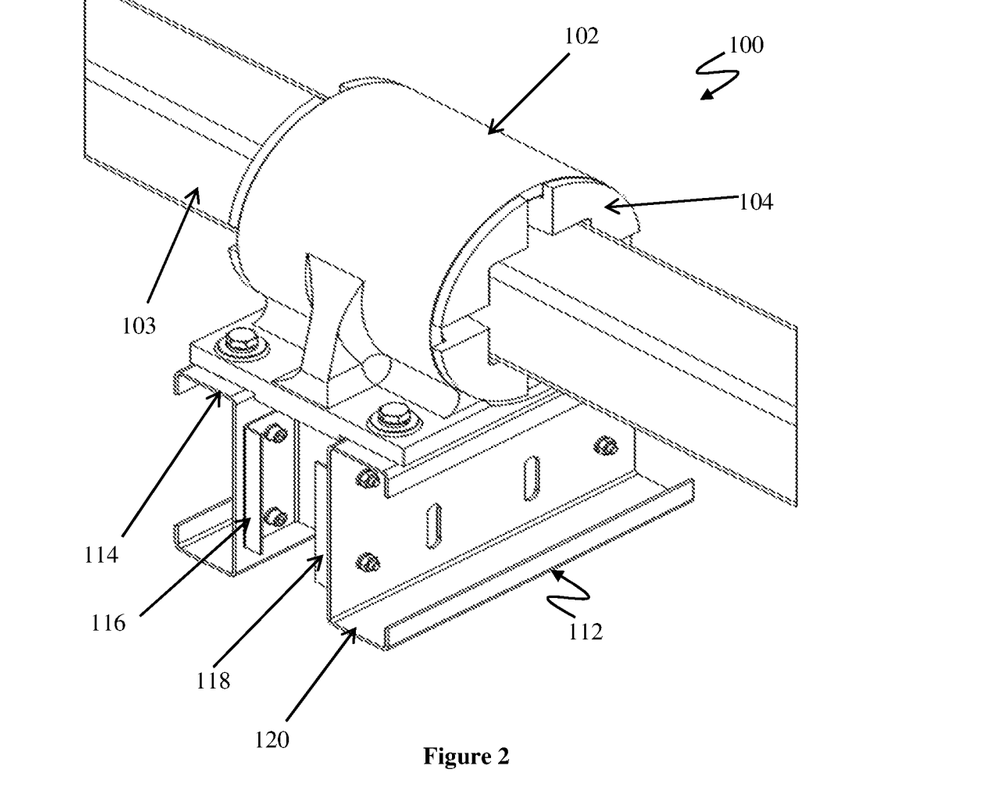
FIG. 2 illustrates an isometric view of the bearing of FIG. 1, holding a component.
Figure 3A:
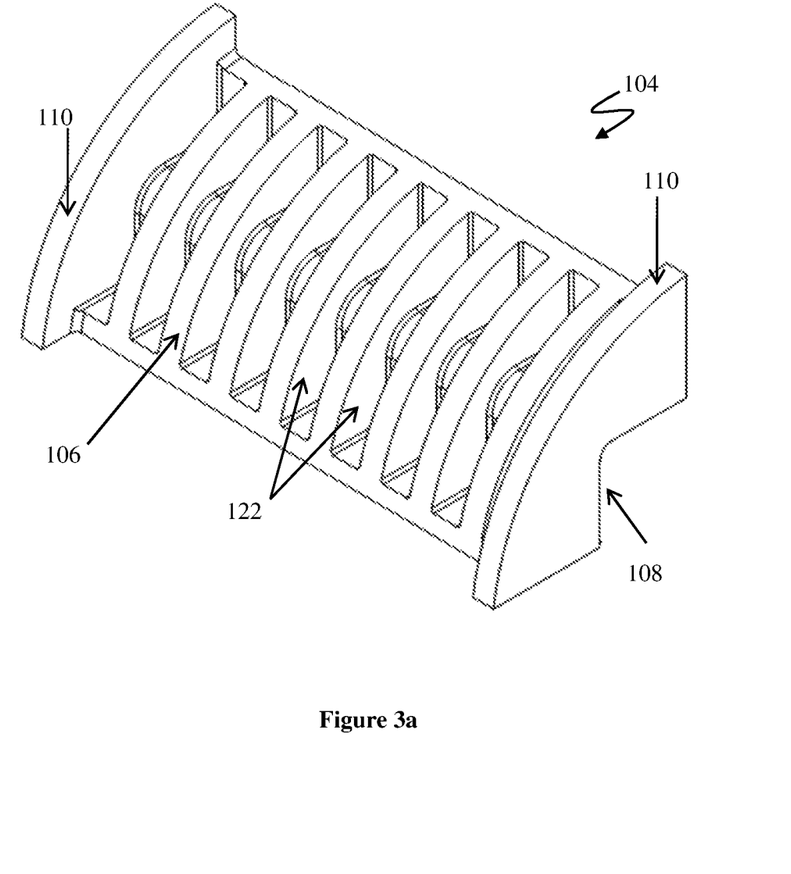
FIGS. 3a and 3b illustrate isometric views of sectional element of the bearing of FIG. 1 showing operative outer surface of the sectional element in accordance with an embodiment of the present disclosure.
Figure 3B:
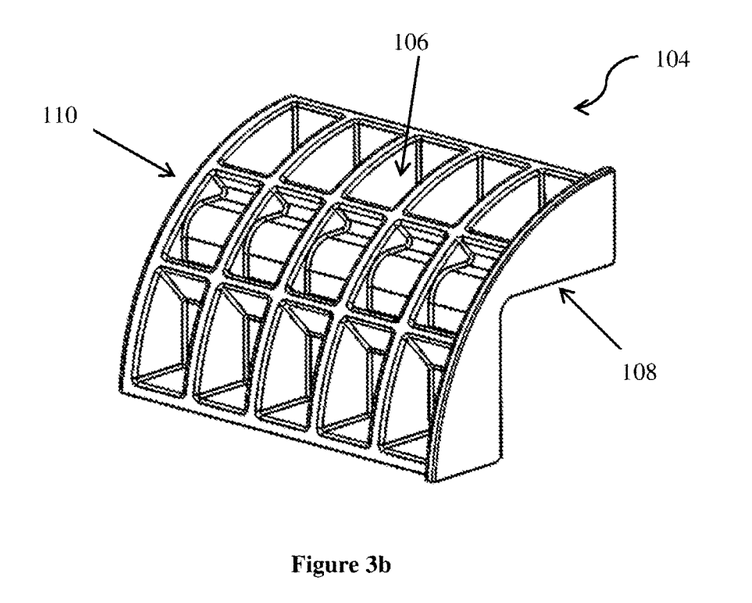
Figure 3C:
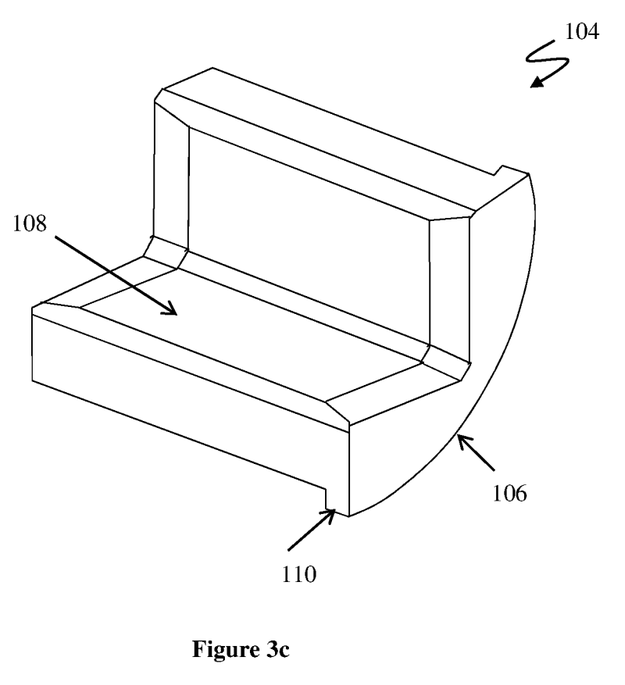
FIG. 3c illustrates an isometric view of the sectional element of the bearing of FIG. 1 showing operative inner surface of the sectional element in accordance with an embodiment of the present disclosure.

FIG. 1 illustrates an isometric view of a bearing 100. FIG. 2 illustrates an isometric view of the bearing 100 holding a component 103. FIGS. 3a and 3b illustrate isometric views of sectional elements 104 of the bearing 100 in showing operative outer surface 106 in accordance with an embodiment of the present disclosure. FIG. 3c illustrates an isometric view of the sectional elements 104 of the bearing 100 showing an operative inner surface 108 of the sectional elements 104 in accordance with an embodiment of the present disclosure.

Referring to the drawing, the bearing 100 for holding the component 103 includes a housing 102 and a plurality of sectional elements 104. The housing 102 is disposed on a base 112 and has a hollow profile. The plurality of sectional elements 104 is disposed within the housing 102. The plurality of sectional elements 104 is configured to hold the component 103. In an embodiment, the component 103 is a rod, a tube, a shaft, or the like. In another embodiment, the cross-section of the component 103 is selected from the group consisting of square, rectangular, triangular, polygonal, semi-circular, circular, complex geometric, and non-geometric shape.

Each sectional element of the plurality of sectional elements 104 is defined by the following structure:

an operative outer surface 106 having a shape complementary to the inner surface of the housing 102;

an operative inner surface 108 having a shape complementary to the component 103 to be held within the bearing 100; and flanges 110 on either end of the plurality of sectional elements 104.

The plurality of sectional elements 104 is disposed within the housing 102. The plurality of sectional elements 104 is configured to hold the component 103 therewithin. The plurality of sectional elements 104 facilitates rotation of the component 103 within the bearing 100. Each of the plurality of sectional elements 104 is defined by the operative outer surface 106 and an operative inner surface 108. The operative outer surface 106 has a shape complementary to an operative inner surface of the housing 102. The operative inner surface 108 of each of the plurality of sectional elements 104 has a shape complementary to the component 103 to be held within the bearing 100. The operative inner surface 108 of each of said plurality of sectional elements 104 has a stepped profile. In an embodiment, the operative inner surface 108 of the plurality of sectional elements 104 is L-shaped stepped surface.

The operative outer surface 106 of each of the plurality of sectional elements 104 has an arcuate shape. In an embodiment, a plurality of slots 122 is configured on the operative outer surface 106 of each of the plurality of sectional elements 104. The plurality of slots 122 reduces the material cost and optimizes the weight of the plurality of sectional element 104.

The flanges 110 are configured on either end of each of the plurality of sectional elements 104. The flanges 110 are adapted to restrict the motion of each of the plurality of sectional elements 104 along the longitudinal axis thereof.

In an embodiment, each of the plurality of sectional elements 104 is at least one polymeric material selected from the group consisting of nylon, polypropylene, polyethylene, polyolefins, polyamides, polyaramides, polyoxymethylene, polytetrafluoroethylene, and composites thereof.

In an embodiment, the housing 102 is of metal, typically, a section of a pipe or a tube which may be seamless or welded or extruded. In another embodiment, the section of pipe or tube is fabricated or formed from an existing tube or pipe to form sections of suitable lengths.

In an exemplary embodiment, for the component 103 to be held within the bearing 100, four sectional elements 104 are required. The four sectional elements are assembled in the housing 102 as follows:

Two sectional elements are inserted into the housing 102 with the flanges 110 jutting out of the housing 102 at both ends. The remaining two sectional elements are then inserted into the housing 102 and held in place by a square dummy element. The cross-sectional area of an assembled holding element formed by combining four such sectional elements 104 such that the inner square cross-section formed by combining the four sectional elements 104 has sides smaller than the sides of the component 103 to be held within the holding element formed by combining the sectional elements 104. Therefore, in an operative configuration, when the sectional elements 104 are held in place within the housing 102, slots are formed between the ends of the sectional elements and in respect of this configuration, four such slots are operatively formed. As far as the cylindrical surfaces are concerned, the effective circular cross-section of a circle formed by joining the four sectional elements together within the housing has a diameter slightly less than the diameter of the cross-sectional circle of the inner surface of the cylindrical housing, thereby allowing the holding element formed by joining the sectional elements 104 together to rotate within the cylindrical housing. The stepped wall of the stepped surface of the sectional element 104 hold a square tube/rod in place. Further reinforcement is provided by putting locking blocks within the slots formed between the sectional elements in their operative configuration.

In use, such bearing 100 formed by the holding element and the housing 102 will remain functional for several years without the requirement of any maintenance.

In another embodiment, a similar housing may be formed by making a one piece or split holding element and a split housing rather than a monolithic housing. Such a bearing is assembled by simply inserting the component 103 within the holder and configuring the housing 102 around the holder.

Figure 4A:
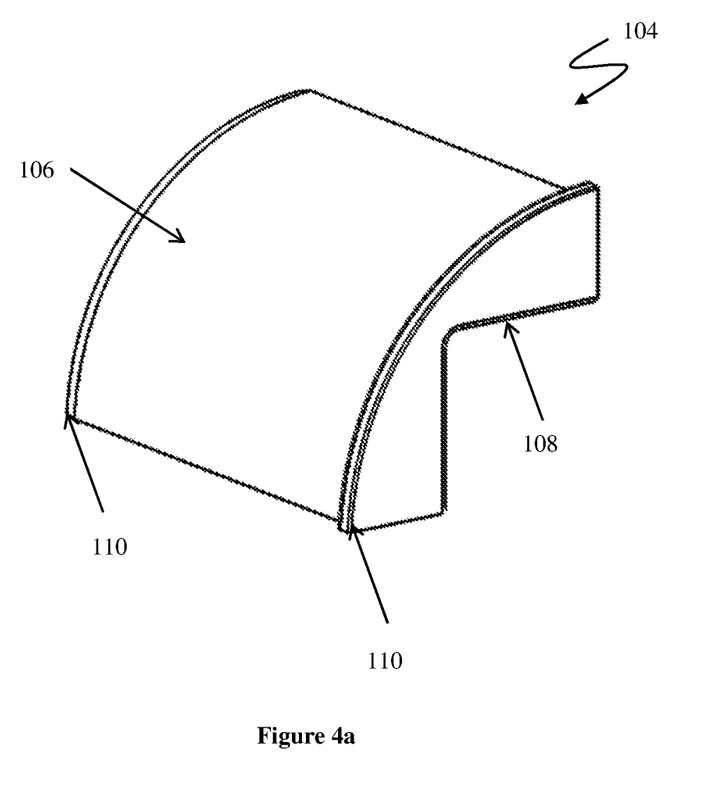
FIGS. 4a and 4b illustrate isometric views of sectional elements of the bearing of FIG. 1 in accordance with another embodiment of the present disclosure.
Figure 4B:
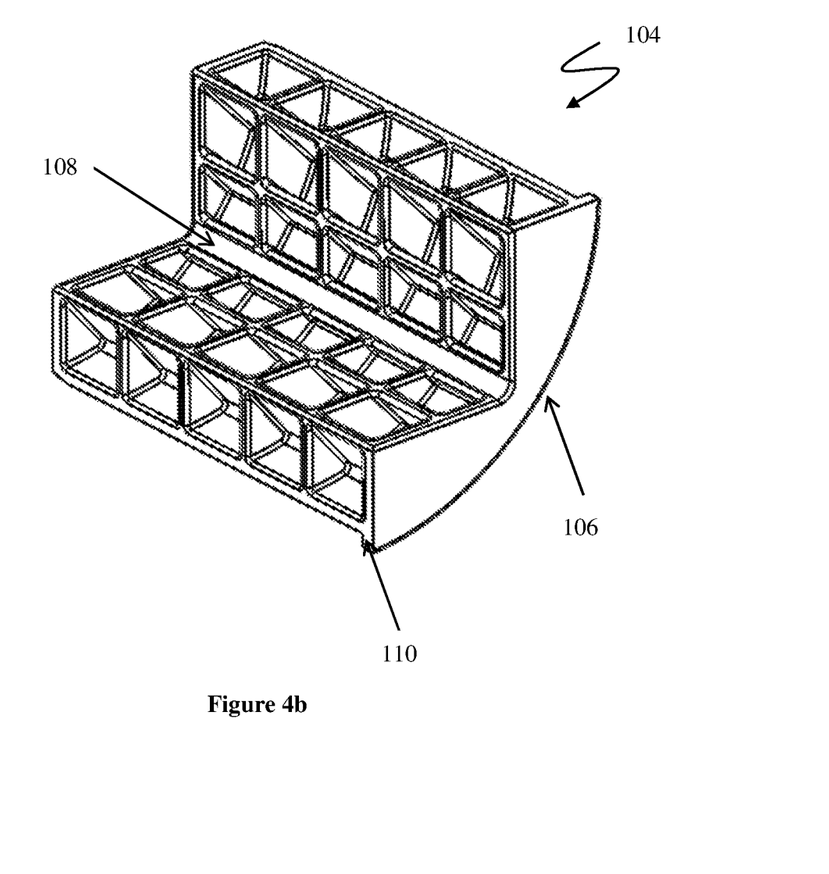

FIGS. 4a and 4b illustrate isometric views of sectional elements 104 of the bearing 100 in accordance with an embodiment of the present disclosure. The operative inner surface 108 of the plurality of sectional elements 104 is 1-shaped stepped surface. A plurality of slots 124 is defined by a plurality of ribs on the operative inner surface 108 of each of the plurality of sectional elements 104. The plurality of slots 124 reduces the material cost and optimizes the weight of the plurality of sectional element 104.

Figure 5:
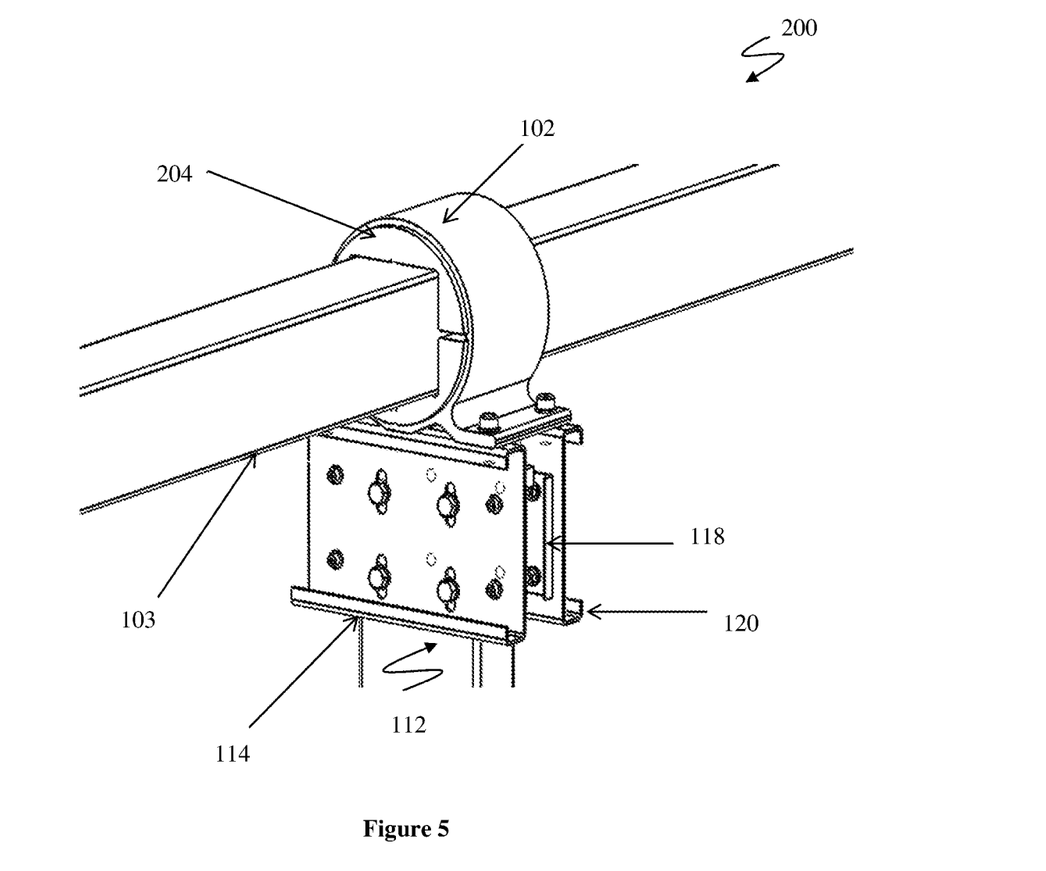
FIG. 5 illustrates an isometric view of the bearing holding a component in accordance with another embodiment of the present disclosure.
Figure 6A:
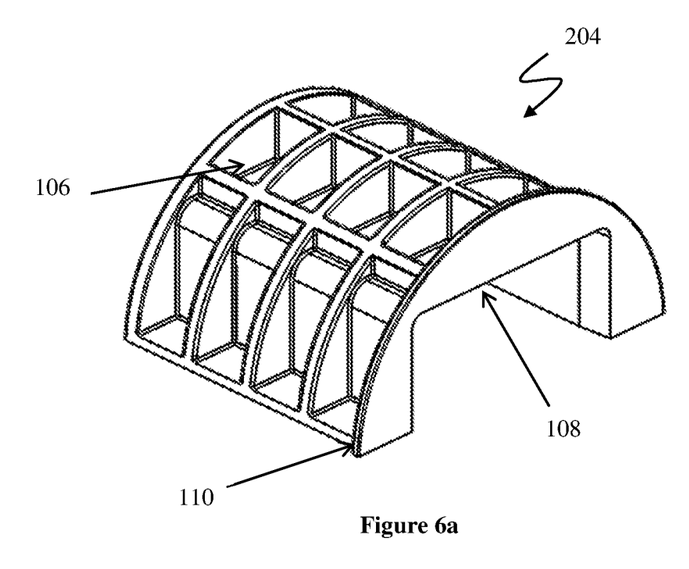
FIGS. 6a and 6b illustrate isometric views of sectional elements of the bearing of FIG. 5 in accordance with an embodiment of the present disclosure.
Figure 6B:
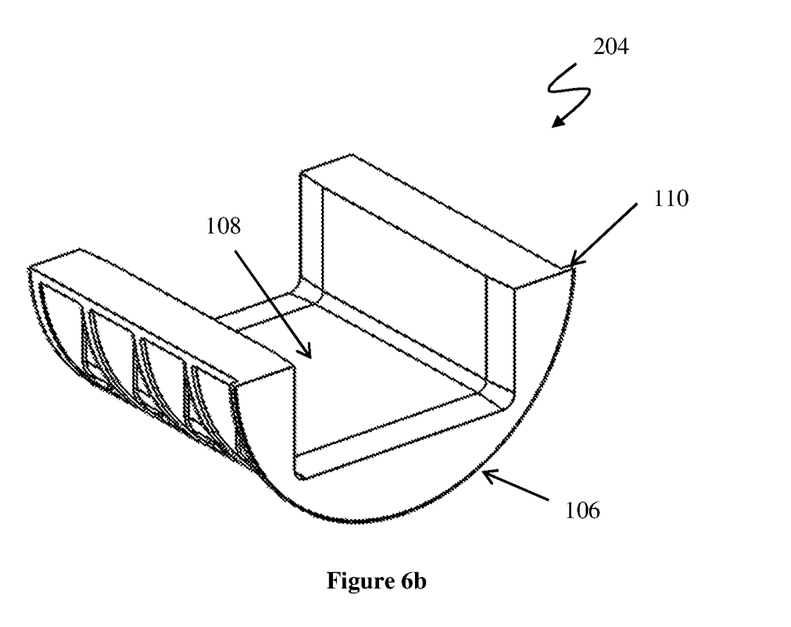

FIG. 5 illustrates an isometric view of a bearing 200 holding the component 103 in accordance with an embodiment of the present disclosure. FIGS. 6a and 6b illustrate isometric views of the sectional elements 204 of the bearing 200 in accordance with another embodiment of the present disclosure. The bearing 200 includes at least two sectional elements 204. The operative inner surface 108 of the at least two sectional elements 204 is u-shaped stepped surface that is complementary to the component 103. The plurality of slots 124 is defined by a plurality of ribs on the operative outer surface 106 of each of the at least two sectional elements 204. The plurality of slots 124 reduces the material cost and optimizes the weight of the at least two sectional elements 204. In an exemplary embodiment, the plurality of slots 124 is formed on the operative inner surface 108 of the at least two sectional elements 204.

As seen in FIG. 1, the housing 102 can be located on a base 112, typically, a rectangular base by connecting four C-channels 114, 116, 118, 120 having an arrangement for vertical movement by using, typically, a screw jack or any other known device. Therefore, the housing 102 of the disclosure has provisions for both operative vertical as well as operative angular displacement.

TECHNICAL ADVANCES AND ECONOMICAL SIGNIFICANCE

The present disclosure described herein above has several technical advantages including, but not limited to, the realization of a bearing that:
- can be assembled easily on-site;
- has few components;
- is easy to manufacture and requires little or almost no maintenance over use for several years; and
- can be assembled without the help of special tools and by a non-skilled work person.

The disclosure has been described with reference to the accompanying embodiments which do not limit the scope and ambit of the disclosure. The description provided is purely by way of example and illustration.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments so fully revealed the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A bearing for holding a component, said bearing comprising:
   a housing disposed on a base, said housing having a hollow profile; and
   a plurality of sectional elements disposed within said housing and configured to hold said component therewithin, said plurality of sectional elements facilitating rotation of said component, each of said plurality of sectional elements defined by an operative outer surface and an operative inner surface, wherein said operative outer surface has a shape complementary to an operative inner surface of said housing, and said operative inner surface of each of said plurality of sectional elements has a shape complementary to said component to be held within said bearing; wherein said operative inner surface of each of said plurality of sectional elements has a stepped profile for receiving said component.

2. The bearing as claimed in claim 1, wherein the cross-section of said component is selected from the group consisting of square, rectangular, triangular, polygonal, semi-circular, circular, complex geometric, and non-geometric shapes.

3. The bearing as claimed in claim 1, wherein said operative outer surface of each of said plurality of sectional elements has an arcuate shape.

4. The bearing as claimed in claim 1, wherein a plurality of slots is configured on said operative outer surface of each of said plurality of sectional elements.

5. The bearing as claimed in claim 1, wherein the material of each of said plurality of sectional elements is at least one polymeric material selected from the group consisting of Nylon, Polypropylene, Polyoxymethylene, Polyethylene, Polyolefins, Polyamides, Polyaramides, Polytetrafluoroethylene, and composites thereof.

6. A bearing for holding a component, said bearing comprising:
- a housing disposed on a base, said housing having a hollow profile; and
- a plurality of sectional elements disposed within said housing and configured to hold said component therewithin, said plurality of sectional elements facilitating rotation of said component, each of said plurality of sectional elements defined by an operative outer surface and an operative inner surface, wherein said operative outer surface has a shape complementary to an operative inner surface of said housing, and said operative inner surface of each of said plurality of sectional elements has a shape complementary to said component to be held within said bearing;
- wherein said operative inner surface of each of said plurality of sectional elements has a stepped profile for receiving said component; and
- wherein each of said plurality of sectional elements has flanges configured on either end thereof, said flanges adapted to restrict the motion of said each of said plurality of sectional elements along the longitudinal axis thereof.

\* \* \* \* \*